(No Model.) 2 Sheets—Sheet 2.

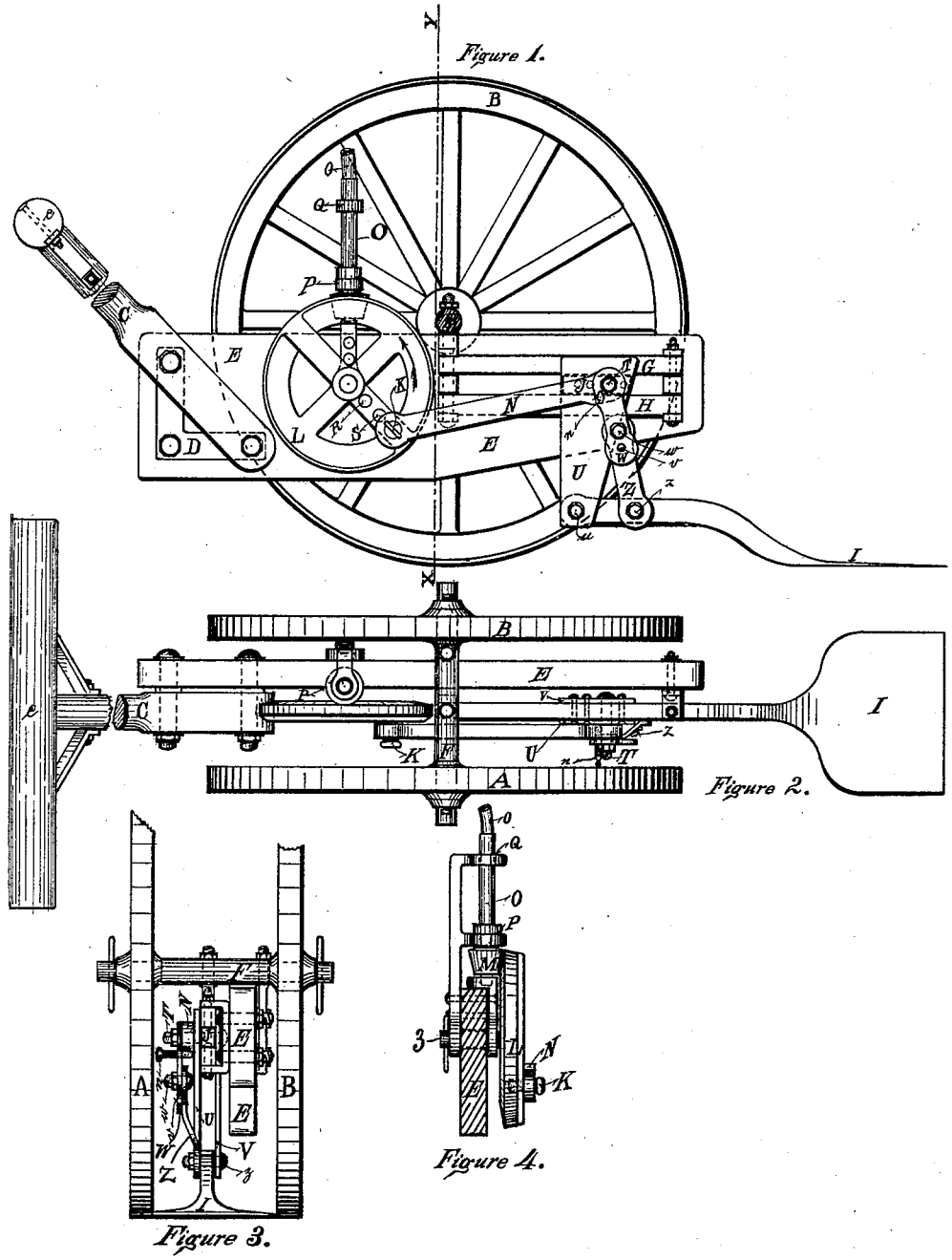

E. A. HERMANN.
WEED CUTTER.

No. 406,280. Patented July 2, 1889.

Witnesses
D. M. Hood,
V. M. Hood.

Inventor
Edward A. Hermann.
By H. P. Hood,
Attorney

UNITED STATES PATENT OFFICE.

EDWARD A. HERMANN, OF INDIANAPOLIS, INDIANA.

WEED-CUTTER.

SPECIFICATION forming part of Letters Patent No. 406,280, dated July 2, 1889.

Application filed March 23, 1889. Serial No. 304,565. (No model.)

*To all whom it may concern:*

Be it known that I, EDWARD A. HERMANN, a citizen of the United States, residing at Indianapolis, in the county of Marion and State of Indiana, have invented a new and useful Improvement in Weed-Cutters, of which the following is a specification.

My invention relates to an improved machine to take the place of a hoe or shovel for cutting up or eradicating grass and weeds, and it is designed particularly for use along graveled paths or driveways or between and alongside the rails of a railroad.

The object of my improvement is to provide, in connection with a pair of carrying-wheels, a suitable bed-piece and a handle for propelling the same. Means whereby a reciprocating motion may be communicated from a separate independent motor, as a steam-engine, to a flat shovel or scraper arranged to operate upon or slightly below the surface of the ground over which the machine moves, said reciprocating movement being either directly in straight lines or having also a vibrating motion in a vertical plane, all as hereinafter fully described.

The accompanying drawings illustrate my invention.

Figure 6:
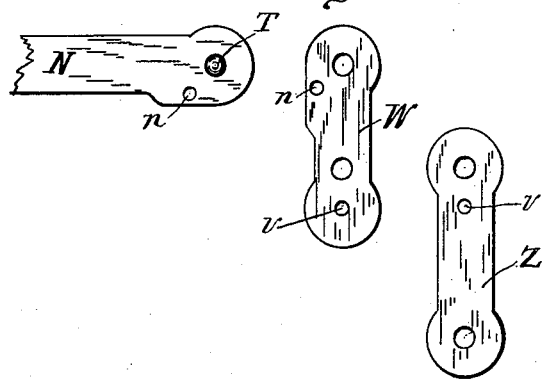
Figure 5:
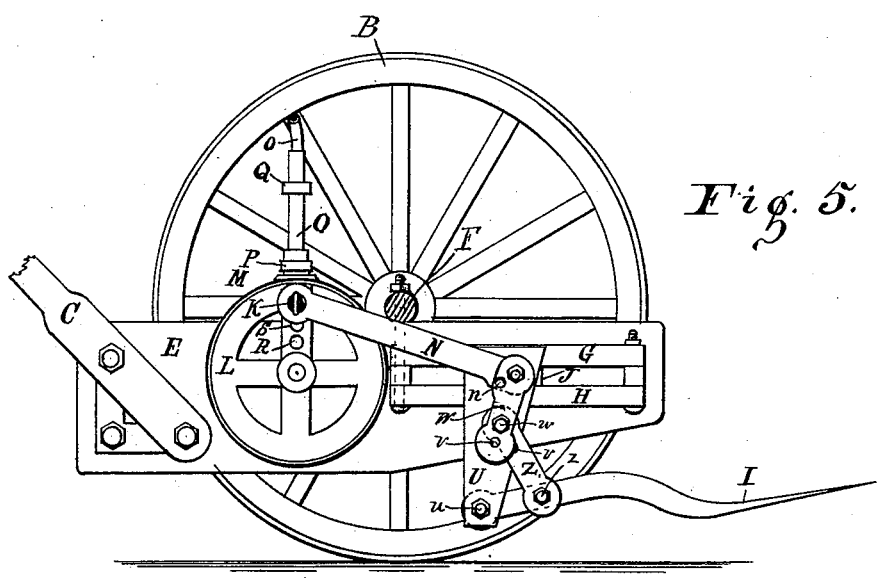

Figure 1 is a side elevation having one of the carrying-wheels removed, showing the parts so coupled as to produce a vertically-vibrating movement of the shovel. Fig. 2 is a plan of the same. Fig. 3 is a front elevation of that portion forward of the line X Y, Fig. 1. Fig. 4 is a rear elevation of that portion between the lines X Y and 1 2, Fig. 1. Fig. 5 is a side elevation showing the position of the parts when the point of the shovel has reached the limit of its upward movement. Fig. 6 shows some of the details separated and on a larger scale.

The carrying-wheels A and B are mounted so as to turn easily on the axle F. The bed-piece or main frame E consists of a flat bar, preferably of wood, suspended edgewise from the axle by bolts, which connect it rigidly thereto. A handle C extends upward and backward from the rear end of frame E. Mounted on one side of frame E, near its front end, is a pair of guide-bars G and H, between which the cross-head J is fitted to slide. Secured to opposite sides of the cross-head J is a pair of thin plates U and V, which embrace between them the guide-bars G H and project below said bars to form a bracket, to which one end of the shovel I is pivoted at *u*. A pin T projects from the cross-head J, and the shovel I is suspended from pin T in a substantially-horizontal position by a pair of links W and Z, which are pivoted together at *w* and attached to the shovel at *z*.

L is a crank-plate which forms also a bevel friction gear-wheel, which engages a corresponding bevel-pinion M. Crank-plate L is provided with a short shaft 3, which is journaled in a bearing on the frame E, and pinion M is secured to a vertical shaft O, which is journaled in bearings P and Q, erected on the frame E. Shaft O is designed to be driven by means of a flexible shaft *o*, connecting it with a motor, as a steam-engine, (not shown,) which may be mounted on a car or truck. Crank-plate L is provided with a series of holes R and S, either of which is adapted to receive the wrist-pin K. The cross-head J and wrist-pin K are connected by a connecting-rod N, which engages pin T. The cross-head and the parts depending therefrom are thus given a reciprocating movement by the rotation of crank-plate L, the length of movement being determined by the distance of the wrist-pin from the center.

In dealing with a light growth of grass or weeds it is sufficient that the shovel I has a simple straightforward movement, and in this case the links W and Z are secured together so as to form practically one link by the pivot *w*, and a pin inserted through a hole *v* near the lower end of link W and passing into a corresponding hole in link Z. It is, however, desirable in dealing with heavier growths to give to the point of the shovel a quick vertical movement at the completion of its forward movement. For this purpose the pin is removed from hole *v* and inserted at *n* through link W and connecting-rod N, as shown in the drawings. Link W is thus fastened to the connecting-rod and forms with it a bell-crank lever, whose fulcrum is the pin T, the effect being to pull up the point of the shovel during the revolution of the crank-plate L from the position shown in Fig. 1 to that shown in Fig. 5.

In operation the machine resting on the ground to be operated on is pushed about by means of the handle C within the limits allowed by the flexible shaft $o$, which, being connected with a steam-engine or other suitable portable motor, rotates shaft O, pinion M, and crank-plate L, and imparts a rapid reciprocating movement to the shovel I, which skims along the surface and cuts off or uproots the weeds.

I claim as my invention—

1. In a weed-cutter, the following elements, namely: an axle and a pair of carrying-wheels mounted thereon, a main frame suspended from said axle, a guiding-handle secured to the frame, a crank-plate arranged to rotate on the main frame, a cross-head arranged to slide in suitable guides on the main frame, a connecting-rod connecting said crank-plate and cross-head, a bracket secured to the cross-head and depending therefrom, a shovel pivoted to said bracket, and a link pivoted to the cross-head and to the shovel so as to hold the shovel in a horizontal position, all combined and arranged to co-operate substantially as and for the purpose specified.

2. The combination, with the crank-plate, the sliding cross-head, the bracket depending from said cross-head, and the shovel pivoted to the bracket, of the connecting-rod having an extension which forms a bell-crank lever therewith, and the link connecting said extension with the shovel, all arranged to co-operate substantially as specified, whereby a horizontally-reciprocating and vertically-oscillating movement is imparted to the shovel, as set forth.

3. The combination, with the crank-plate L, sliding cross-head J, having pin T, bracket U and V, shovel I, and connecting-rod N, of the link W, having pin $n$, arranged to temporarily secure said link and connecting-rod together, and link Z, pivoted to the shovel and to link W, all substantially as and for the purpose set forth.

4. The combination, with the crank-plate L, sliding cross-head J, having pin T, bracket U V, shovel I, and connecting-rod N, of the links W and Z, said links being pivoted together at one end and having their opposite ends pivoted, respectively, to pin T and to the shovel, and means, substantially as shown and described, for securing the overlapping ends of the links rigidly together, for the purpose set forth.

EDWARD A. HERMANN.

Witnesses:
H. P. HOOD,
V. M. HOOD.